United States Patent
Weller et al.

(10) Patent No.: US 7,878,070 B2
(45) Date of Patent: Feb. 1, 2011

(54) CHUCK BODY FOR A CHUCK, CHUCK AND METHOD FOR DETERMINING A CLAMPING FORCE ON SUCH A CHUCK

(75) Inventors: Hans-Michael Weller, Affalterbach (DE); Attilio Mandarello, Affalterbach (DE)

(73) Assignee: Hainbuch GmbH Spannende Technik (DE)

(*) Notice: Subject to any disclaimer, the term of this patent is extended or adjusted under 35 U.S.C. 154(b) by 254 days.

(21) Appl. No.: 12/210,846

(22) Filed: Sep. 15, 2008

(65) Prior Publication Data

US 2009/0072502 A1 Mar. 19, 2009

Related U.S. Application Data

(63) Continuation of application No. PCT/EP2007/001793, filed on Mar. 2, 2007.

(30) Foreign Application Priority Data

Mar. 16, 2006 (DE) .................. 10 2006 013 935

(51) Int. Cl.
*G01N 3/02* (2006.01)
(52) U.S. Cl. .......................... 73/760; 73/856
(58) Field of Classification Search .............. 73/760, 73/856–860
See application file for complete search history.

(56) References Cited

U.S. PATENT DOCUMENTS

| | | | | |
|---|---|---|---|---|
| 4,232,547 A * | 11/1980 | Kasper | ................ | 73/862.628 |
| 4,254,676 A * | 3/1981 | Wilson | ................ | 82/152 |
| 4,909,521 A * | 3/1990 | Ovanin | ................ | 279/126 |
| 5,052,700 A * | 10/1991 | Howard et al. | ................ | 279/106 |
| 5,135,242 A * | 8/1992 | Toth | ................ | 279/4.02 |
| 6,341,553 B1 | 1/2002 | Rohm | | |
| 6,375,197 B1 * | 4/2002 | Barbieux | ................ | 279/132 |
| 6,834,730 B2 * | 12/2004 | Gass et al. | ................ | 173/2 |
| 6,908,086 B2 | 6/2005 | Rall | | |
| 7,654,178 B2 * | 2/2010 | Hall et al. | ................ | 82/165 |

FOREIGN PATENT DOCUMENTS

| | | |
|---|---|---|
| DE | 3212759 A1 | 10/1983 |
| DE | 19906803 A1 | 8/2000 |
| DE | 10360917 A1 | 7/2005 |
| EP | 0491259 A1 | 6/1992 |
| WO | 2005/110649 A1 | 11/2005 |

* cited by examiner

*Primary Examiner*—Max Noori
(74) *Attorney, Agent, or Firm*—Akerman Senterfitt

(57) ABSTRACT

A chuck body for a clamping chuck for clamping a workpiece has a substantially rotationally symmetrically formed basic body, provided on which is a receiving opening, which is formed as a portion of a cone and is formed for receiving a clamping head in such a way as to transmit force. Attached to the basic body is a deformation sensor, for example as a strain gauge, which is intended and designed for determining a deformation of the basic body in a circumferential direction. In this way, the condition and state of wear of the clamping chuck can be determined.

6 Claims, 2 Drawing Sheets

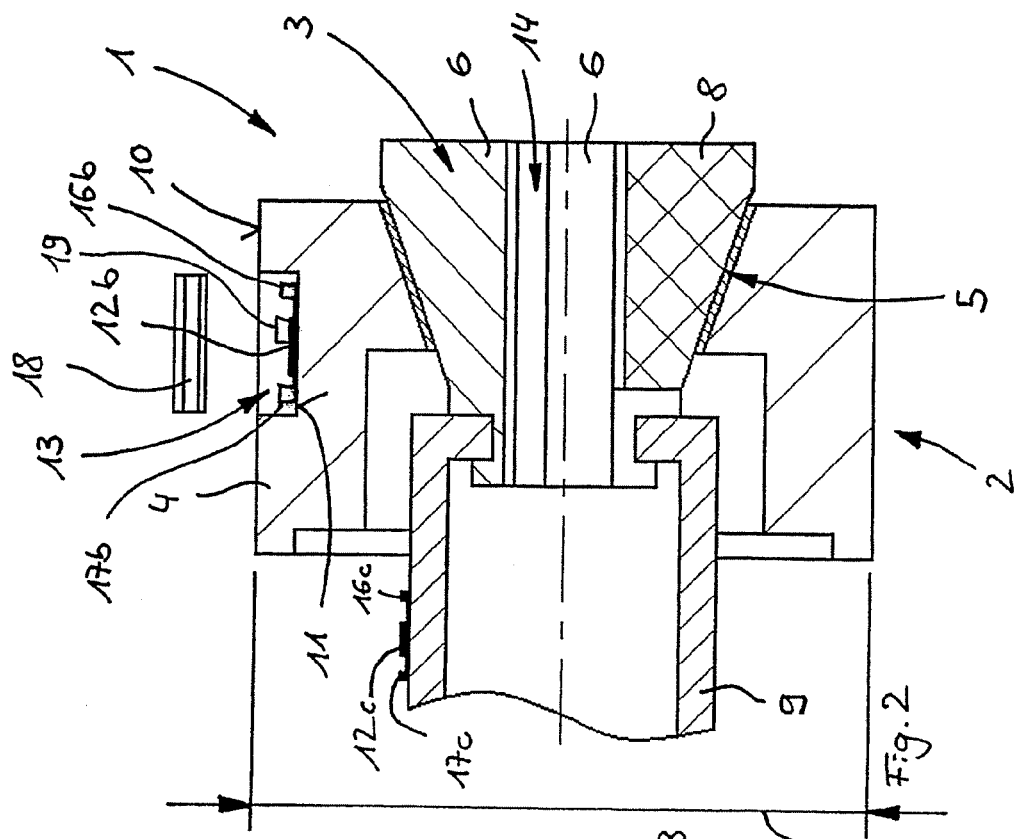
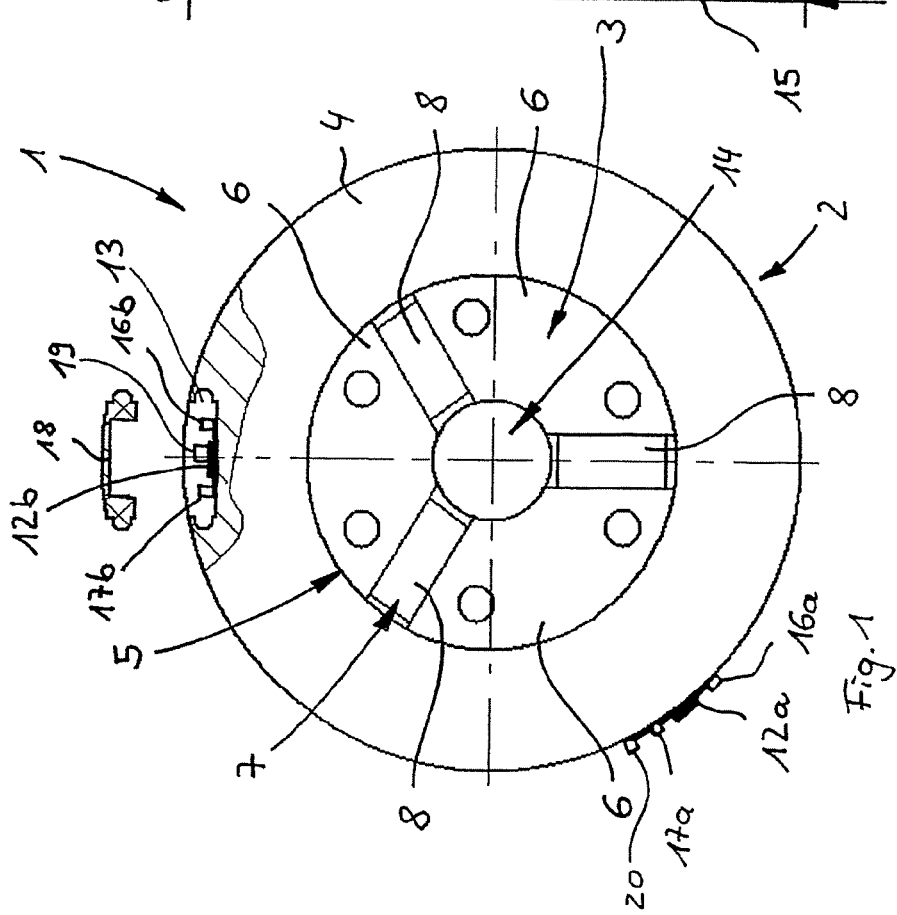

CHUCK BODY FOR A CHUCK, CHUCK AND METHOD FOR DETERMINING A CLAMPING FORCE ON SUCH A CHUCK

FIELD OF APPLICATION AND PRIOR ART

The invention relates to a chuck body for a chuck for clamping a workpiece, having a substantially rotationally symmetrically designed basic body on which is provided a cone portion-shaped receiving opening designed for a force-transferring reception of a clamping head, as well as a chuck equipped with such a chuck body and a method for determining a clamping force on a chuck.

U.S. Pat. No. 6,908,086 describes a chuck with a chuck body having an internal conical surface for receiving a clamping head. The clamping head has an at least segmentally conical outer contour which is matched to the chuck body and is subdivided by means of several separation slots into individual clamping jaws, which are coupled together in relatively movable manner by elastic connecting elements. By exerting an axially directed tensile force on the clamping head the latter can be fixed in the chuck body and as a result of the tensile force exerted there is a radially inwardly directed relative movement of the clamping jaws leading to a narrowing of a free diameter bounded by said jaws, so that a workpiece can be clamped in the free diameter between the clamping jaws.

As a result of their clamping precision and their advantageous, automatic controllability such chucks are preferably used in mass production, particularly of turned and milled parts, and must be able to function under rough ambient conditions over a long period of time without dropping below a minimum clamping force. In the case of a known use for a chuck, following a predetermined number of machining cycles carried out and in particular turning or milling processes, in which the chuck has been used for clamping workpieces, the chuck must be maintained, because otherwise the clamping force can drop below a minimum clamping force. In the case of said maintenance the clamping head is disassembled from the chuck body, the clamping head and chuck body are cleaned, provided with fresh lubricant and subsequently reassembled. It is possible that a chuck maintenance was already overdue as a result of unfavourable ambient conditions and the final machining cycles were carried out with a clamping force below the minimum clamping force. Under favourable ambient conditions the case can arise that the chuck is maintained at a time when this was not necessary. A considerable influence on the need for maintenance of a chuck is exerted by contamination and high temperatures, which as a result of dirt particles and/or transformation processes in the lubricant can lead to a rapid increase in the friction between the clamping head and chuck body and consequently have a negative influence on the clamping force on the workpiece.

Problem and Solution

The problem of the invention is to provide an aforementioned chuck body, a chuck and an aforementioned method making it possible to obviate the prior art problems and in particular allow an as needed chuck maintenance.

This problem is solved by a chuck body having the features of claim 1, a chuck having the features of claim 12 and a method having the features of claim 13. Advantageous and preferred developments of the invention form the subject matter of the further claims and are explained in greater detail hereinafter. The devices and the method are in part jointly explained and said explanations and the corresponding features apply both to the devices and the method. By express reference the wording of the claims is made into part of the content of the description.

According to a first aspect of the invention a deformation sensor is fitted to the basic body of the chuck body and is provided and constructed for determining a deformation of the basic body in a circumferential direction. The chuck body, which is typically substantially rotationally symmetrical, is used for the force transfer between a machine spindle of a machine tool and the clamping head, which is in turn intended to exert the necessary clamping forces on the workpiece. In the case of the chuck by means a tension tube associated with the machine spindle a tensile force is exerted on the clamping head leading to a wedging or keying of the cone portion-shaped areas of the clamping head and the chuck body. During said wedging movement on the one hand the desired narrowing of the free diameter between the clamping jaws of the clamping head is brought about. On the other hand, as a result of the reaction forces between the clamping head and the chuck body there is a radially directed, outward extension of the chuck body, i.e. an increase in the chuck body diameter. This diameter increase is dependent on the geometrical design of the clamping head and the chuck body, as well as on the tensile force exerted on the clamping head. However it is also dependent on the friction between clamping head and chuck body, which is determined by external circumstances such as contamination and/or gumming up of the lubricant between clamping head and chuck body.

In the case of a constant tensile force on the clamping head and increasing friction between clamping head and chuck body, there is a decrease in the clamping force on the workpiece and therefore also the reaction force leading to a chuck body diameter increase. Thus, the change in the chuck body diameter can be used as an indicator for the clamping force exerted on the workpiece. As the diameter increase on the chuck body is relatively limited and a length measurement in the radial direction is more complicated, for exactly establishing the clamping force an extension or expansion of the chuck body in the circumferential direction is determined. This extension is clearly correlated with the diameter increase and therefore with the clamping force. To determine the extension in the circumferential direction, a deformation sensor is fitted to a chuck body surface oriented circumferentially so as to allow conclusions to be drawn regarding the diameter change and therefore the clamping force of the clamping head on the workpiece.

According to a development of the invention the deformation sensor is positioned on an outer surface or the outside or circumferential surface of the basic body. The highest circumferential chuck body deformation occurs on the outer surface or outside of the basic body and is in the form of a length change. Thus, for determining the clamping force relatively simple deformation sensors known from length measurement technology can be used and which despite an inexpensive design and easy fitting ensure a precise measurement result.

In a further development of the invention the deformation sensor is placed on the outer surface or outside of the basic body so as to be accessible from the outside. This allows an easy fitting of the deformation sensor and provides good accessibility for fault detection or an optionally necessary replacement. In addition, for maintaining or repairing the deformation sensor there is no need to dismantle the chuck, so that in the case of a fault a rapid and therefore inexpensive solution is available, which plays a positive part in connection with the usability of the chuck.

In a further development of the invention the deformation sensor as a strain gauge is constructed with strain or extension-dependent electrical resistance. A strain gauge more particularly has a polyimide support film on which is applied in meander-like manner a wire-like resistor preferably made from constantan. Through the use of polyimide it is possible to ensure a particularly temperature-insensitive support film design. The use of constantan as the material for the resistance wire ensures a high temperature stability, so that a temperature compensation is not vital for ensuring a reliable measurement result.

During an expansion or increase in its length, the resistance wire undergoes a cross-sectional reduction, so that the electrical resistance rises. On compressing the resistance wire there is a cross-sectional increase in the size of the electrical conductor, so that the electrical resistance decreases. These extension-dependent changes of the electrical resistance are preferably determined by an evaluating circuit downstream of the strain gauge and made available as a measurement signal.

In a further development of the invention with the deformation sensor is associated an information transmission device, which is designed for a wireless signal transmission, preferably via a radio link, from deformation sensor to a receiver means. Thus, the deformation sensor measurement signal can be transmitted in uncomplicated manner and without complicated cabling to a receiver means, which is in particular fitted to the machine tool. As a result of the wireless transmission of signals the chuck body can be easily replaced and stored in the same way as a known chuck body.

According to another development of the invention with the basic body is associated a coil mechanism for an energy conversion according to the dynamo principle for making available electrical energy for the deformation sensor. The chuck body is typically received on a machine spindle, particularly of a lathe and this rotates for machining the workpiece. Thus, the chuck can be rotated relative to the machine tool. The rotary movement can be used for generating electrical energy for the deformation sensor. For this purpose to the machine tool is fitted a magnet device, particularly with permanent magnets or magnet coils, which is provided for exciting a coil located in the chuck body. As a result of the relative movement of the coil in the magnetic field caused by the magnet device, an electrical voltage is induced in the coil for supplying energy to the deformation sensor and optionally to a downstream evaluating device.

In a further development of the invention with the basic body is associated an energy storage device such as a battery or a capacitor for providing electrical energy for the deformation sensor. This ensures in a simple manner an electrical energy supply to the deformation sensor. Such an energy supply is completely autarchic.

In a further development of the invention the information transmission device is in the form of an RFID transponder for a data transfer via an inductive near field or an electromagnetic far field. An RFID transponder is a device which with the aid of so-called radio frequency identification permits a transmission of data such as measurement signals. For this purpose an inductive near field or an electromagnet far field is necessary and is made available by a transmitting device such as the machine tool. Advantageously the field is generated by a device separate from the machine tool. It can for example function independently of the machine, which facilitates the usability of chucks equipped with RFID transponders and/or with other signal transmission devices.

The RFID transponder has an antenna, which can receive the irradiated electromagnetic field and attenuate it in predetermined manner. As a result electrical energy can be made available for operating the deformation sensor and in particular also for its evaluation, whilst as a result of a planned interference to the electromagnetic field and an analysis of the field interference it is possible to implement a signal transmission from deformation sensor to transmitting device. RFID transponders are more particularly made available in the form of labels or adhesive labels, into which is integrated the entire circuit including the deformation sensor and antenna and which merely need to be stuck to the outer surface of the chuck body.

According to a further development of the invention a motion sensor, particularly an acceleration sensor is provided in order to determine a rotary movement of the basic body or chuck body, particularly a rotation speed. In a first embodiment of the invention a simply designed motion sensor is provided, which is able to establish the stoppage and movement of the chuck body, but supplies no information on a speed of motion. With such a construction it is possible to determine a clamping force of the clamping head in the stopped state and also during chuck movement, whilst also determining a clamping force reduction between both operating states. The clamping force of the chuck is reduced with increasing rotation speed through the radially outwardly directed centrifugal forces acting on the clamping jaws and on the chuck body. Thus, an information concerning the speed of the chuck body, which can be correlated with the determined chuck body deformation is of particular interest. For this purpose it is possible to provide on the chuck body an acceleration sensor for determining the speed of the chuck independently of the machine tool.

In a further development of the invention on the basic body is provided at least one further deformation sensor for determining an axial force acting on the basic body. This makes available an additional characteristic quantity, which can be correlated with the determined radial chuck body deformation and optionally the chuck body speed during workpiece machining and permits a particularly precise determination of the clamping force for the workpiece.

According to another aspect of the invention a chuck with a chuck body having at least one of the aforementioned features and with a clamping head receivable in the chuck body is provided. The clamping head has several clamping jaws spaced from one another by separation slots and which can be interconnected in relatively movable manner by means of elastic connecting elements and provided for the fixing of a workpiece. Such a chuck ensures a cycle-independent, as needed maintenance of the clamping head and chuck body as a function of the actual clamping force. The chuck together with a receiver means can make available information on the workpiece clamping force derived from the chuck body deformation and therefore information on the chuck maintenance state, without it being necessary to dismantle the clamping head from the chuck body. The invention is generally usable in the case of chucks and with particular advantage with an axial tension chuck.

According to a further aspect of the invention a method is provided for determining a clamping force on a chuck fitted to a machine spindle of a machine tool and having the following steps: determining a deformation of a chuck body by means of a deformation sensor with the machine spindle stationary and the workpiece fixed, determining a deformation of the chuck body during a rotary movement of the machine spindle with the workpiece fixed, calculating a deformation difference between the stationary state and the rotary movement and outputting and/or displaying the deformation difference and/or comparing the deformation difference with a value table and outputting a signal on dropping below a desired value.

This method determines a clamping force present during chuck rotation and vital for workpiece machining. This clamping force can differ significantly from the clamping force when stationary and this can in particular result from the centrifugal forces which occur. In addition, setting and sliding processes between clamping head and chuck body as a result of rotation can occur and can bring about an at least partial compensation of the centrifugal force-dependent clamping force reduction. The method makes it possible to determine the actual clamping force on the workpiece.

According to another development of the invention after carrying out maintenance work on the chuck a calibration of the deformation sensor is performed. During maintenance typically the clamping head and chuck body are cleaned and lubricated, so that subsequently an advantageous cooperation between clamping head and chuck body with low friction and a resulting high clamping force for the workpiece is ensured. This starting situation is used for calibrating the deformation sensor and the chuck body deformation obtained with the workpiece fixed is determined and stored by the deformation sensor. The clamping force reduction occurring after carrying out several machining cycles can therefore be determined as a deviation from the originally available clamping force and therefore used directly for evaluating the chuck maintenance state.

In a further development of the invention a transmission of measurement signals can be carried out with a variable data transmission rate as a function of a change to the measurement signal, preferably with a lower data transmission rate in the case of little or no measurement signal change. This can ensure an energy saving data transmission, which is of particular interest for energy storage means integrated into the chuck body and which must be replaced or at least recharged when the stored energy is exhausted. The energy saving can preferably be brought about in that for a constant measurement signal or with only minor changes to the measurement signal a low data transmission rate is present, i.e. only a few measurement signals are transmitted per time unit. With greater measurement signal changes a higher data transmission rate is brought about in order to ensure an adequate resolution of the changes. This is of particular interest if the receiver means is coupled to a machine control of the machine tool and on dropping below the minimum clamping force the machine tool must be switched off for safety reasons.

In a further development of the invention a chuck body deformation determined in the circumferential direction is correlated with an axial force exerted on the chuck body by the machine tool in order to establish a clamping force efficiency of the chuck. The clamping force efficiency is a characteristic quantity allowing state information to be obtained on the entire clamping system formed by machine spindle, tension tube and chuck. Assuming that the tensile force exerted on the tension tube by a servo unit is known, by determining the tensile force on the chuck body it is possible to establish whether the tension tube or tensile force transmission to the chuck body are faulty. By correlating the tensile force with the clamping force of the clamping head it is possible to determine the relationship between the tensile force on the clamping head and the resulting clamping force making it possible to derive precise information on the chuck maintenance state. In an advantageous embodiment of the invention temporarily in place of the workpiece use is made in the clamping head of a clamping force pick-up in order to determine the actual clamping force and therefore calculate a possibly necessary correction factor for the clamping force determined via the chuck body deformation.

In a further development of the invention there is a regulation or control of an axial tensile force exerted on the chuck as a function of the circumferentially determined chuck body deformation, particularly as a function of the clamping force efficiency of the chuck. This allows an at least partial compensation of the clamping force reduction occurring as a function of the chuck maintenance state by increasing the tensile force exerted by the tension tube.

These and further features can be gathered from the claims, description and drawings and the individual features, both singly or in the form of subcombinations, can be implemented in an embodiment of the invention and in other fields and can represent advantageous, independently protectable constructions for which protection is claimed here. The subdivision of the application into individual sections and the subheadings in no way restrict the general validity of the statements made thereunder.

BRIEF DESCRIPTION OF THE DRAWINGS

An embodiment of the invention is described hereinafter relative to the attached diagrammatic drawings, wherein show:

FIG. 1 A front view of a chuck with a deformation sensor integrated into the chuck body and a deformation sensor fitted to the chuck body.

FIG. 2 A sectional view of the chuck according to FIG. 1.

DETAILED DESCRIPTION OF THE EMBODIMENTS

Figure 3:
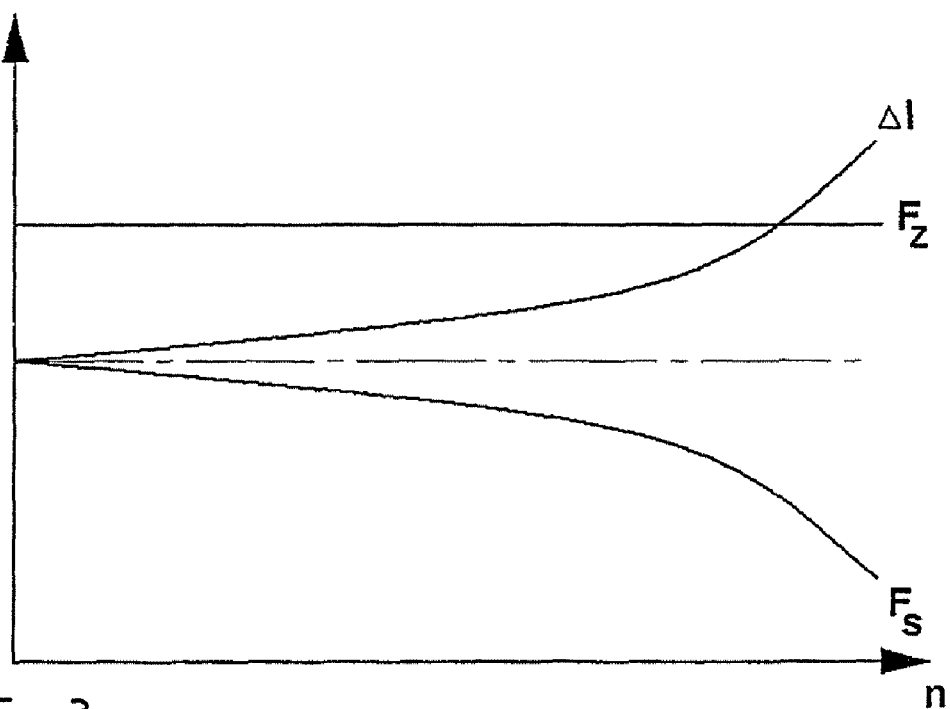
FIG. 3 A graph with the path of the clamping force and extension of the basic body over the speed with constant clamping force.

FIGS. 1 and 2 show a chuck 1 for clamping a preferably cylindrically designed workpiece in the manner of a collet. The chuck 1 has a substantially rotationally symmetrical basic body 4 forming an essential part of chuck body 2. On the basic body 4 is provided a cone portion-shaped reception opening 5 for a force-transferring reception of a clamping head 3. The clamping head 3 is constructed from three clamping jaws 6 spaced from one another by separation slots 7, which are in some areas bridged by elastic connecting elements 8, which interconnect the clamping jaws 6 in self substance, relatively movable manner. On a tapered end portion of the clamping head 3 the clamping jaws 6 are provided with a circumferential groove in which can engage a tension tube 9, which forms part of a not shown machine spindle and which can exert a tensile force on the chuck 3.

On an outer surface 10 is provided a deformation sensor 12a. A pocket-like depression 13 contains a further deformation sensor 12b on an outer face of the basic body 4. According to FIG. 2, a deformation sensor 12c for tensile force determination is fitted to tension tube 9.

All the deformation sensors 12a, 12b, 12c are in the form of strain gauges and in each case equipped with an integrated signal processing unit 16a, 16b, 16c for a processing, by means of calculation algorithms, of the electrical resistance values produced by the strain gauges 12a, 12b, 12c. With the signal processing unit 16a, 16b; 16c is associated an information transmission device 17a, 17b, 16c, also integrated into the deformation sensors 12a, 12b, 12c, for the wireless transmission of the calculated measured values. With the deformation sensor 12b received in depression 13 is associated as an energy storage means a button cell battery 19 for a continuous signal transmission to a not shown receiver means. The depression 13 is closed by an elastomeric plug 18.

The remaining deformation sensors 12a, 12c, which can be provided in supplementary or alternative manner, are in the form of RFID labels and are stuck to the outer surface 10 and tension tube 9 and are supplied by a not shown, external energy source, which can be placed on the machine tool or at some other point in space. The deformation sensor 12a is provided with an integrated motion sensor in the form of an acceleration sensor 20 and which is used for detecting a movement of the chuck and which can be fitted in the same way also to the other deformation sensors 12b or 12c.

The deformation sensors 12a, 12b on outer surface 10 and in depression 13 are provided for determining a deformation of the circumference of basic body 2. Such a deformation can occur if a workpiece is inserted in the receiving hole 14 bounded by clamping jaws 6 and subsequently tension tube 9 introduces a tensile force into the jaws 6. As a result the clamping head 3 is moved in the direction of the tension tube 9 and due to the conical design of the receiving opening 5 and clamping head 3 there is a radially inwardly directed deflection movement of the mutually relatively movable clamping jaws 6, so that the workpiece can be clamped between said jaws 6.

The relative movement of the clamping jaws 6 brought about by the tensile force of tension tube 9, on clamping the workpiece, leads to a radially outwardly directed supporting force of the outer faces of the clamping jaws 6 on the receiving opening 5. Thus, the basic body 4 is radially outwardly extended and is subject to a rise in the external diameter 15, which is substantially proportional to the exerted clamping force. The increase in the external diameter 15 is associated with a length change to the circumference of basic body 4. Said length change can be determined by the deformation sensors 12a, 12b fitted to outer surface 10 and outer face 11.

The application of a tensile force to chuck 1 by means of tension tube 9, which can be assumed as known or which is determined by deformation sensor 12c on tension tube 9, in the case of a freshly maintained chuck 1 gives a maximum tensile force and a resulting maximum increase in the external diameter 15 and the circumference of basic body 4. The maximum value for the circumference of basic body 4 is stored as a reference value in signal processing unit 16a, 16b, 16c and/or in the receiver unit and can therefore be used as a reference for further clamping cycles of chuck 1.

In the case of the path of the deformation I on the outer circumference of the chuck body and determined by deformation sensor 12a in FIG. 3 and the correlated clamping force Fs, determined by the reflection or mirroring of the deformation curve, over the chuck speed n on machining a workpiece it is clear that the deformation and clamping force Fs initially only change slightly. However, with increasing speed there is an ever increasing drop in the clamping force Fs and can lead to a complete clamping force loss.

Figure 4:
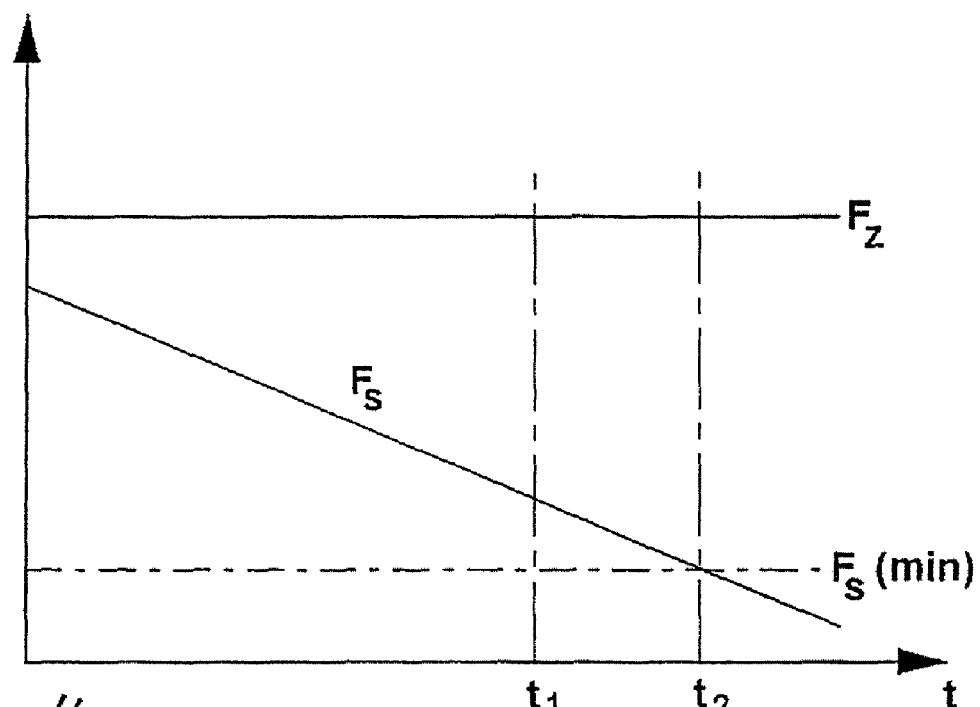
FIG. 4 A graph with the path of the clamping force over a chuck use period with constant clamping force.

In the path of the clamping force Fs over time t shown in FIG. 4 it is clear that with an increasing number of machining cycles performed, i.e. typically over a period of weeks, there is an exemplified-represented decrease in the clamping force Fs, despite a constant tensile force Fz. This reduction in the clamping force Fs can mainly be attributed to the above-described ageing effects and the contamination of the lubricants provided between clamping head and basic body and if a chuck maintenance is missed, gives rise to a drop below a minimum clamping force Fs (min) at which it is just possible to ensure a reliable workpiece machining.

In order to eliminate the risk of an inadequate clamping force Fs, a chuck is typically maintained at a time t1 at which there is still a reserve present until the minimum clamping force Fs (min) is reached. By using the inventive clamping force determination method the maintenance of the chuck can be carried out precisely at the time of reaching the minimum clamping force Fs (min), so that a larger number of machining cycles can be implemented between two maintenance cycles, but still a dynamic chuck maintenance can be performed as a function of the possibly varying ambient conditions.

The invention claimed is:

1. A method for determining a clamping force on a chuck for clamping a workpiece and fitted to a machine spindle of a machine tool, the chuck comprising:
   a chuck body having:
      a substantially rotationally symmetrically formed basic body;
      a cone portion-shaped receiving opening provided on said basic body and designed for a force-transferring reception of a clamping head:, and
      a deformation sensor fitted to said basic body and constructed for a determination of a deformation of said basic body in a circumferential direction to said basic body; and
   a clamping head received in said chuck body and having several clamping jaws mutually spaced by separation slots, wherein said clamping jaws are interconnected in relatively movable manner by elastic connecting elements between them and wherein said clamping jaws are provided for fixing a workpiece in said chuck,
   wherein the method comprises the steps of:
   determining a deformation of said chuck body by means of said deformation sensor with said machine spindle being held in a stationary state and said workpiece being held fixed,
   determining a deformation of said chuck body during a rotary movement of said machine spindle and with said workpiece fixed,
   calculating a deformation difference between said stationary state and said rotary movement, and
   outputting or displaying said deformation difference or comparing said deformation difference with a value table and outputting a signal on dropping below a desired value for said deformation difference.

2. The method according to claim 1, wherein said deformation sensor is calibrated after carrying out maintenance work on said chuck.

3. The method according to claim 1, wherein said measurement signals are transmitted with a variable data transmission rate as a function of a measurement signal change.

4. The method according to claim 3, wherein said data transmission rate is with a low data transmission rate with a limited measurement signal change.

5. The method according to claim 1, wherein a circumferentially determined deformation of said chuck body is correlated with an axial force exerted by said machine tool on said chuck body in order to establish a clamping force efficiency of said chuck.

6. The method according to claim 5, wherein a control of an axial tensile force exerted on said chuck is carried out as a function of said circumferentially determined deformation of said chuck body as a function of said clamping force efficiency of said chuck.

* * * * *